United States Patent [19]

Tycksen, Jr. et al.

[11] Patent Number: 5,898,777
[45] Date of Patent: Apr. 27, 1999

[54] DIGITAL PRODUCT DISSEMINATION AND SALE

[75] Inventors: Frank A. Tycksen, Jr., Beaverton; Charles W. Jennings, Portland, both of Oreg.

[73] Assignee: Portland Software, Inc., Portland, Oreg.

[21] Appl. No.: 08/613,712

[22] Filed: Mar. 7, 1996

[51] Int. Cl.[6] .................................................. H04K 1/00
[52] U.S. Cl. ................................ 380/4; 380/24; 380/25
[58] Field of Search .................................. 380/4, 23, 24, 380/25, 30

[56] References Cited

U.S. PATENT DOCUMENTS

| | | | |
|---|---|---|---|
| 4,528,643 | 7/1985 | Freeny, Jr. | 380/4 |
| 5,341,429 | 8/1994 | Stringer et al. | |
| 5,590,197 | 12/1996 | Chen et al. | 380/24 |
| 5,715,314 | 2/1998 | Payne et al. | 380/24 |
| 5,724,424 | 3/1998 | Gifford | 380/24 |

*Primary Examiner*—George Dombroske
*Assistant Examiner*—Paul D. Amrozowicz
*Attorney, Agent, or Firm*—Keith A. Cushing

[57] ABSTRACT

Digital product dissemination and sale occurs across a broad spectrum of distribution platforms making available a packaged digital product for wide spread public distribution. Execution of a packaged digital product on a purchasing consumer's personal computer provides opportunity to the user-consumer for purchase and delivery of the digital product. The user-consumer triggers a purchase step conducted automatically and directly between the personal computer and a bank network. A publishing merchant need not be involved in the purchase step other than receiving credit for the purchase in the credit card bank network. Delivery of the digital product following purchase occurs automatically and without use of cumbersome encryption keys.

16 Claims, 7 Drawing Sheets

DIGITAL PRODUCT DISSEMINATION AND SALE

BACKGROUND OF THE INVENTION

The present invention relates generally to product dissemination, and particularly to distribution and sale of digital content products.

Publishers of digital content, e.g., computer software or image data, disseminate products to consumers in traditional fashion by packaging, shipping, and making available their products in retail outlets. A consumer goes to the retail outlet, selects a product for purchase, and interacts with a sales clerk to purchase the product. The consumer purchases the product by a variety of methods, e.g., cash, check, or credit card. The consumer must, however, visit the retail outlet during its business hours.

Some digital content distribution schemes allow free distribution of the digital product, e.g., by copying, or free distribution via telephone connection with a host computer. The consumer uses the product and, if willing, sends payment to the product source. Alternatively, a bulletin board system, e.g., America On Line or Compuserve, may allow users download privileges and later bill for the of files downloaded.

Other distribution schemes require payment first to obtain access to digital products on a particular host computer. For example, a bulletin board system takes the user-consumer's credit card number and establishes a given amount of credit for that user-consumer on the bulletin board system. The user-consumer then uses these system-credits to purchase products, i.e., download files containing digital products.

The compact disc read only memory (CD ROM), with its dense and massive storage capability, holds many digital products. Further, with data compression a single CD ROM holds a significant number of digital products. Encryption restricts unauthorized use of the digital products. The CD ROMs are distributed freely with a user-interactive program thereon allowing access to, i.e., trial use or purchase of, selected digital products. A recipient of the CD ROM executes the user-interactive program to sample, e.g., execute a limited number of times, the digital products. The recipient must purchase and receive delivery of the digital product, however, by voice interaction with an outside operator and by interaction with the user-interactive program.

The payment step occurs generally outside the user-interactive program. To pay for the selected product, the user-consumer calls an operator and identifies the product selected for purchase. The operator then receives verbally from the user-consumer a credit card number. This interaction likely requires the operator to read back the credit card number to confirm accuracy. The operator then interacts with the credit card bank, or banking network, to verify the credit card number and debit the user-consumer's credit card account for the purchase price of the selected digital product.

The operator then again interacts with the user-consumer and provides a "key" for unlocking the selected digital product, i.e., allowing a useable copy of the product to be taken from the CD ROM. The key, typically a long sequence of alpha-numeric characters, must be read verbally to the user-consumer and copied by the user-consumer. The user-consumer reads back to the operator the key again to verify accuracy. Human error and frustration make this portion of the purchase step undesirable for its lack of automation and undue complexity. In any event, the payment step gives to the user-consumer a key to unlock a particular digital product stored on his or her CD ROM.

The user-interactive program requires the user-consumer to manually enter the unlock key. If the correct key is entered, the user-interactive program delivers the product to the consumer, e.g., by decryption (unlocking) and/or de-compression, and copying a working or usable version of the digital product from the CD ROM onto the user-consumer's computing device.

Figure 1A:
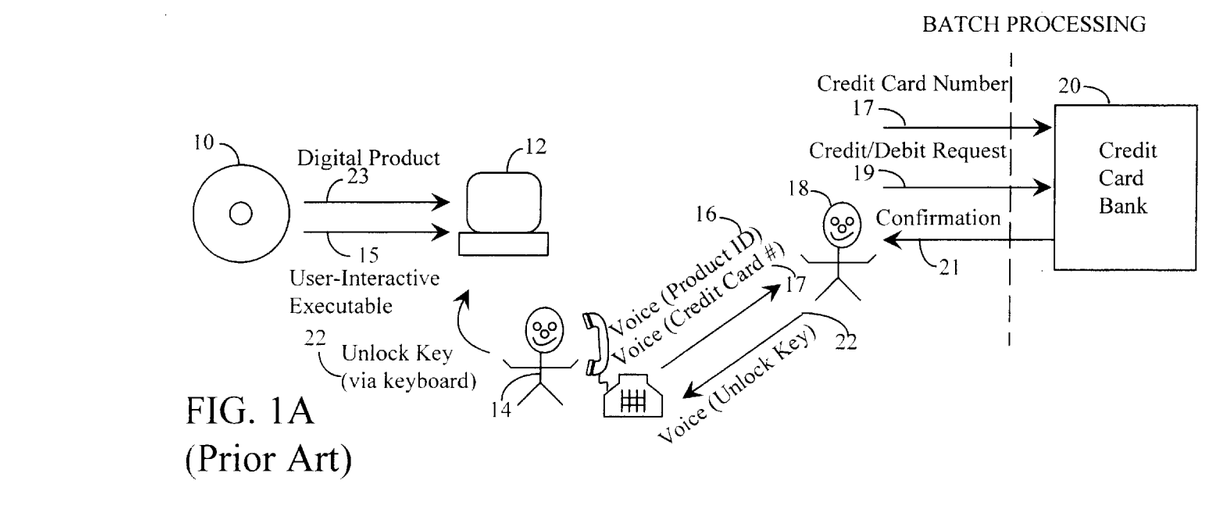
FIGS. 1A and 1B illustrate by data flow diagram prior art methods of digital product dissemination by CD ROM and public network, respectively.

FIG. 1A illustrates by data flow diagram use of the prior art CD ROM platform for digital product dissemination. In FIG. 1A, CD ROM 10 comes into possession of the user-consumer 14, e.g., by direct mail. The user-consumer inserts CD ROM 10 into personal computer (PC) 12. Computer 12 loads from CD ROM 10 and executes a user-interactive program 15 providing information and demonstration programs for a collection of digital products available on CD ROM 10. Once user-consumer 14 selects a digital product for purchase, the consumer initiates a voice telephone call to an operator 18. In the voice telephone call, user-consumer 14 provides to operator 18 a product identification 16, i.e., the product selected for purchase, and credit card data 17. Phone operator 18 then submits by batch processing the credit card data 17 and a credit/debit request 19 to a credit card bank 20. Credit card bank 20 then returns to operator 18 a transaction confirmation 21.

Submission of credit card data 17 and request 19 to bank 20 and return of confirmation 21 can occur by batch processing, i.e., not a real-time transaction. Accordingly, operator 18 does not typically have from credit card bank 20 immediate authorization to purchase. The overall interaction between operator 18 and user-consumer 14 is a tedious and often frustrating transaction for the user-consumer 14. In any event, operator 18 eventually receives confirmation 21 from credit card bank 20 and provides by voice communication with user-consumer 14 an unlock key 22. User-consumer 14 copies the unlock key manually, e.g., writes it on a piece of paper, or enters key 22 directly into computer 100. When a valid unlock key 22 is entered, user-interactive program 15 responds by providing the purchased digital product 23, i.e., delivers a working copy of the selected digital product 23 by copying a useable, i.e., retail, version of the product onto the hard disk of PC 12.

The transaction conducted under the prior art CD ROM type of digital product dissemination requires on average 15 minutes, and sometimes days, to complete. In some cases, the merchant, as represented by phone operator 18, may immediately provide the unlock key 22 to user-consumer 14, taking a risk that the credit card bank 20 may ultimately fail to return confirmation 21. Even so, the transaction requires significant time to complete and, importantly, requires that the user-consumer 14 interact verbally with a telephone operator and make use of, i.e., obtain by voice communication and enter manually into computer 12, a complex unlock key needed to complete purchase of the digital product 23.

Unfortunately, consumers don't want to remember or use complex unlock keys, they just want to quickly and simply obtain the selected digital product with as little intermediate activity as possible. Consumer's typically don't appreciate having to interact with a telephone operator and wait for the operator to return the key. Such activity is believed to be a significant barrier to this type of product dissemination. Software publishers have experimented with this type of product dissemination, but the response rates, believed to be on the order of 0.2 to 0.6 percent and at best on the order of one percent, are unacceptably low.

The Internet, an organization of hundreds of interconnected hosts or servers and an addressing scheme supporting world-wide personal addressing and access to data available on the hosts or servers, holds great potential for global distribution of digital products. Generally, the model of digital product dissemination on the Internet provides an area holding useable, i.e., decrypted, digital products and restricts access or downloading privileges as a function of an approved credit card transaction. Security, however, becomes a concern when disseminating digital products on the Internet. Financial data, e.g., credit card numbers, are passed across the Internet, perhaps through several hundred servers, before reaching the intended destination. Thus, an individual's credit card information could be scattered throughout the Internet, with the potential for unauthorized use at many Internet sites. A variety of security measures have attempted to make more secure, e.g., encrypt, transmittal of financial data on the Internet. Even so, persons with sufficient knowledge of the data transfer protocol can monitor or intercept communications on the Internet.

A further concern arises under this model of digital product dissemination with respect to the decrypted material. Decrypted material is easer to corrupt, e.g. install virus programming, than encrypted material. Maintaining and transferring the digital products on the Internet, or any publicly available media, in an decrypted form exposes the material to theft or corruption. A corrupted digital product could cause significant damage to an unsuspecting user-consumer. Accordingly, the digital product publisher may be exposed to liability for its dissemination of a corrupted and damaging product.

Figure 1B:
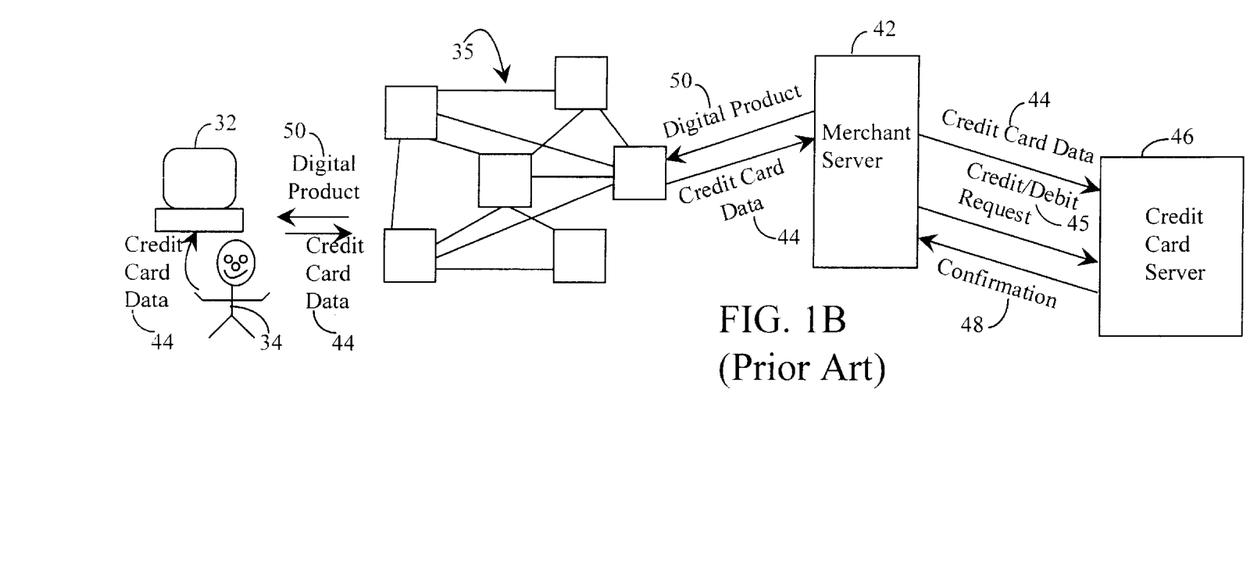

FIG. 1B illustrates by data flow diagram the prior art use of the Internet for digital product dissemination. In FIG. 1B, user-consumer 34 sits at personal computer (PC) 32 and interacts via Internet 35 with a merchant server 42. Such interaction includes opportunity for the user-consumer 14 to browse lists of digital products available for purchase at merchant server 42. Once the user-consumer 14 selects a digital product for purchase, credit card data 44, entered manually at PC 32, travels, via Internet 35, to merchant server 42. Merchant server 42 then forwards the credit card data and a credit/debit request 45 to credit card server 46. After validating the credit card information 44, e.g., by batch processing, credit card server 46 later returns a confirmation 48 to merchant server 42. Merchant server 42 then makes available the selected digital product 50 by downloading the decrypted product 50 to PC 32 via Internet 35. Important to note, all transactions illustrated in FIG. 1B occur over the public Internet 35. Accordingly, any such information exchanged, e.g., credit card information 44 and digital product 50, are susceptible to interception, corruption, theft or misuse.

While credit card numbers provide a prompt and popular method of payment, the user-consumer must protect his or her credit card data against unauthorized use. Enhanced security for credit card data establishes enhanced consumer confidence, and therefore greater consumer appeal. Unfortunately, providing credit card data to a computer bulletin board, a telephone operator, or to any merchant introduces security risks. A significant percentage of credit card fraud is by the merchant or merchant's employees. Whenever credit card data travels directly or indirectly to the merchant via a computer network, e.g., along the Internet, a variety of opportunities exist for intercepting the credit card data. Thus, while providing credit card data directly to a merchant enhances purchase automation, it compromises credit card data security.

It would be desirable, therefore, to provide a more automated and generalized purchase and delivery system for digital products. A variety of competing goals must be satisfied. User-consumer accessibility must support broad dissemination across a number of storage and transfer platforms while remaining sufficiently generalized to permit wide-spread use. Purchase automation must make the transaction brief and simple to maintain ease of use while protecting the security of financial data, e.g., credit card data. Furthermore, it would be desirable to allow public distribution of digital products without risk of corruption when installed for use. The subject mater of the present invention addresses these and other aspects of digital product dissemination and sale.

SUMMARY OF THE INVENTION

The present invention provides a system for distributing and selling a digital product to a plurality of consumers where each consumer has an associated consumer machine and the digital product includes digital content useable on the consumer machines. A product conversion process reversibly converts the digital product to a public state unusable on the consumer machines. A product packaging process couples as a packaged product the digital product in its public state and a point of sale program executable on the consumer machines. The point of sale program can read the digital product in its public state and deliver an operable form of the digital product to a consumer machine for use thereon. A public distribution process makes the packaged product publicly available to a plurality of potential consumers by transfer or copy among digital storage media. In a consumer executed purchase and delivery process, a given member of the potential consumers executes the point of sale program on his or her consumer machine and selects the digital product for purchase. The point of sale program obtains from the consumer financial information, relays the financial information to a banking entity, obtains authorization to debit the purchase amount from the customer account, and thereafter delivers the product by copying a useable form of the digital product onto storage media of the given consumer machine for use thereon.

A product distribution and sale system under the present invention includes a banking network receiving financial information and implementing credit/debit transactions between members of a set of consumers and members of a set of merchants. A public distribution system makes available publicly a packaged digital product. The packaged digital product includes a copy of a product for purchase in an inoperable state and includes a point of sale program interactive with the banking network to relay financial information from and obtain a purchase authorization for a given consumer receiving the packaged digital product and executing the point of sale program. The point of sale program upon execution converts the product from its inoperable state to an operable state upon receiving the purchase authorization for the consumer.

An apparatus for distribution and sale of a digital product useable on consumer machines includes digital storage media containing a packaged digital product. The packaged digital product contains a point of sale program executable on consumer machines and contains a form of the digital product unusable on the consumer machines. The point of sale program, upon execution on a given consumer machine, automatically interacts with a banking network and thereafter converts the unusable form of the digital product to a useable form for use on the given consumer's machine.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 2:
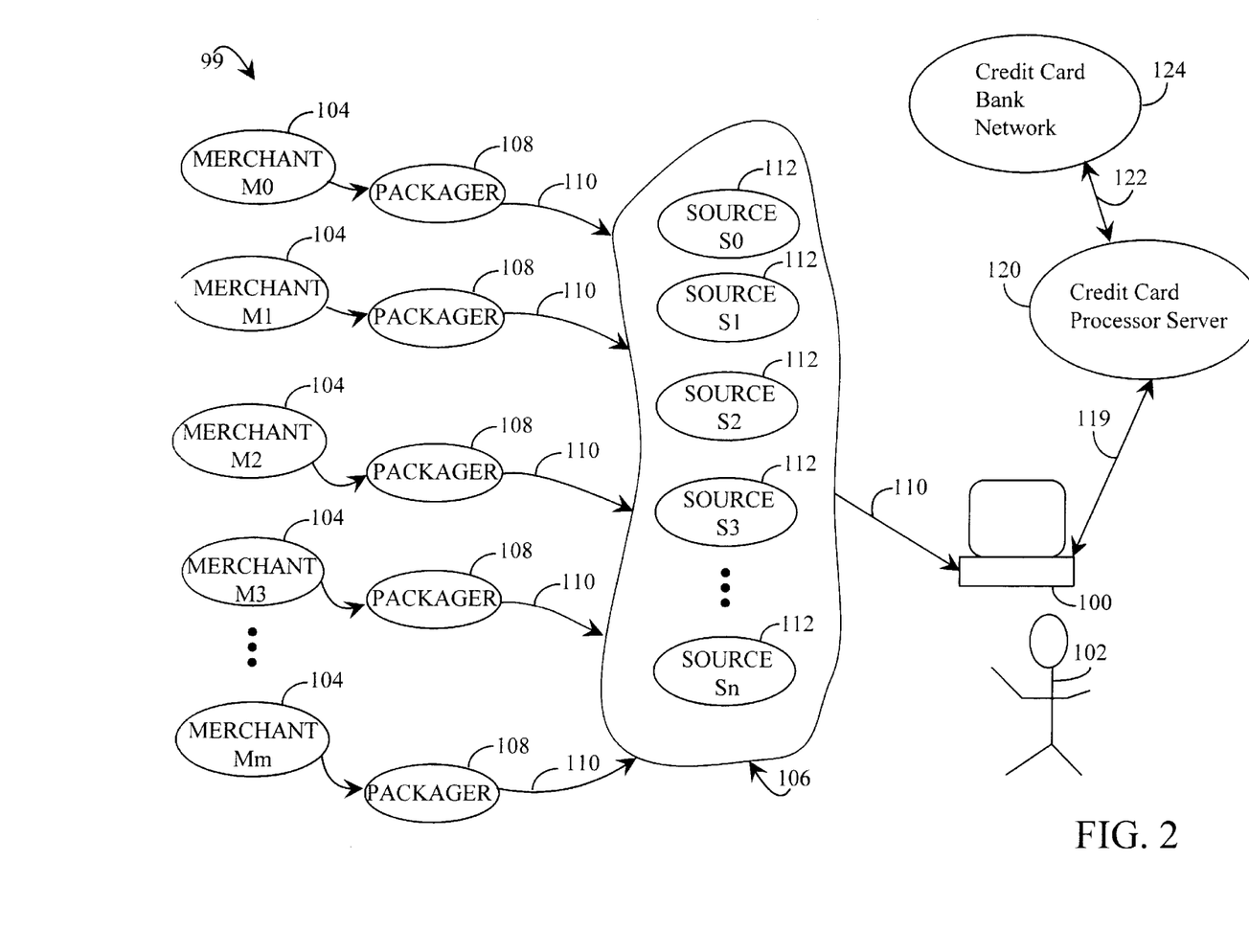
FIG. 2 illustrates generally the architecture of a digital product dissemination and sale system according to a preferred form of the present invention.

FIG. 2 illustrates generally a digital product dissemination and sale system 99 under a preferred form of the present invention. In FIG. 2, a personal computer 100 makes use of a variety of digital products. For example, such digital products may include software, image data, video data, or sound data. User-consumer 102 operates personal computer 100, and wishes to purchase digital products for use thereon.

Digital products originate from a variety of publishing merchants 104. In FIG. 2, publishing merchants 104, represented individually as merchants $M_0-M_m$, are registered for commercial activity under system 99. Each merchant 104 introduces into public domain 106 "packaged" forms of their digital products available for purchase. While described more fully hereafter, each "packaged" digital product includes a first portion executable on computer 100 and interactive with user-consumer 102. Each "packaged" digital product also contains a compressed and encrypted form of the actual product available for purchase. Thus, packaged digital products 110 contain a digital product for purchase, but not a directly useable form of the digital product.

In accordance with the present invention, the executable portion of the "packaged" digital product interacts with user-consumer 102 and completes directly a banking transaction with the user-consumer's credit card bank network. The merchant 104 publishing the digital product selected for purchase need not and is not involved in the purchase step. User-consumer 102 performs the "purchasing and delivery" steps in a brief, e.g., less than one minute, automated telephone connection with high security provided relative to financial data, i.e., does not expose the user-consumer 102 credit card information to merchants 104 or to intermediate entities such as may be monitoring exchange of such information. Furthermore, public dissemination of the packaged digital product 110 protects the digital product contained therein against corruption, either intentional or accidental, at the time of decryption. The method of dissemination and sale under the present invention prevents a consumer from buying a defective product. The encryption and purchase process inherent in the dissemination and sale method of the present invention prevents "bad products" from being installed on a consumer's machine. The method of dissemination and sale under the present invention makes available for purchase authenticated and non-corrupt digital content and further guarantees payment to the owner for each instance of decryption of the digital content. As a result, packaged digital products 110 travel safely in unsecured environments, e.g., the Internet, publicly distributed storage media, and publicly accessible bulletin board systems.

Each merchant 104 packages the digital product for public distribution in public domain 106 by submission to a packager 108. Such packaging can be done internally, i.e., by the merchant 104, or by an outside party. In any event, packaged digital products 110 are freely introduced into public domain 106 with the hope of wide-spread and copious distribution. For example, digital products 110 are posted on the Internet, uploaded to bulletin boards, and distributed by direct mail or give-away packages on CD ROM or diskette.

User-consumer 102 finds packaged digital products 110 at sources 112, illustrated individually as sources $S_0-S_n$, within public domain 106. Sources 112 constitute a variety of physical locations and storage media. For example, digital products 110 may be found on bulletin board systems, on portions of the Internet, on counter tops at retail outlets, in direct mail advertising packages, and by any of a variety of mechanisms which may be employed to widely distribute and make freely available packaged digital products 110 within public domain 106. User-consumer 102 interacts in public domain 106 to obtain packaged digital products 110. For example, user-consumer 102 may visit a retail outlet and obtain a CD ROM containing one or more digital products 110. User-consumer 102 downloads digital products 110 from bulletin board systems or the Internet. User-consumer 102 receives digital products 110 from other user-consumers by way of disk copy or modem connection.

Generally, when user-consumer 102 executes a packaged digital product 110 on personal computer 100, computer 100 presents user-consumer 102 with demonstrations and information concerning digital products available for purchase. Once user-consumer 102 selects a digital product for purchase, computer 100 completes a direct, brief, and automated one-to-one telephone interaction with a credit card processor server 120. Credit card processor server 120 operates on a dedicated connection 122 to a credit card bank network 124.

User-consumer 102 provides, by keyboard entry, to computer 100 his or her credit card information. The publishing merchant 104 never receives the user-consumer 102 credit card information. Instead, the user-consumer 102 computer 100 dials out directly to the credit card processor server 120 on a dedicated, private telephone connection 119. Server 120 then interacts with bank network 124 to establish a credit/debit transaction between the user-consumer 102 and the publishing merchant 104. Alternatively, computer 100 may dial out to a private intermediate transaction management vendor, which in turn interacts directly with bank network 124. Once the transaction is approved, i.e., user-consumer 102 debited and the publishing merchant 104 credited, computer 100 receives from credit card processor server 120 an unlock key and automatically unpackages the digital product selected for purchase. In other words, computer 100 automatically applies the unlock key to digital product 110 and extracts therefrom a useable, i.e., working, version of the digital product purchased. As may be appreciated, user-consumer 102 need not use, i.e., enter manually, the unlock key. This is done directly and automatically by computer 100.

Figure 3A:
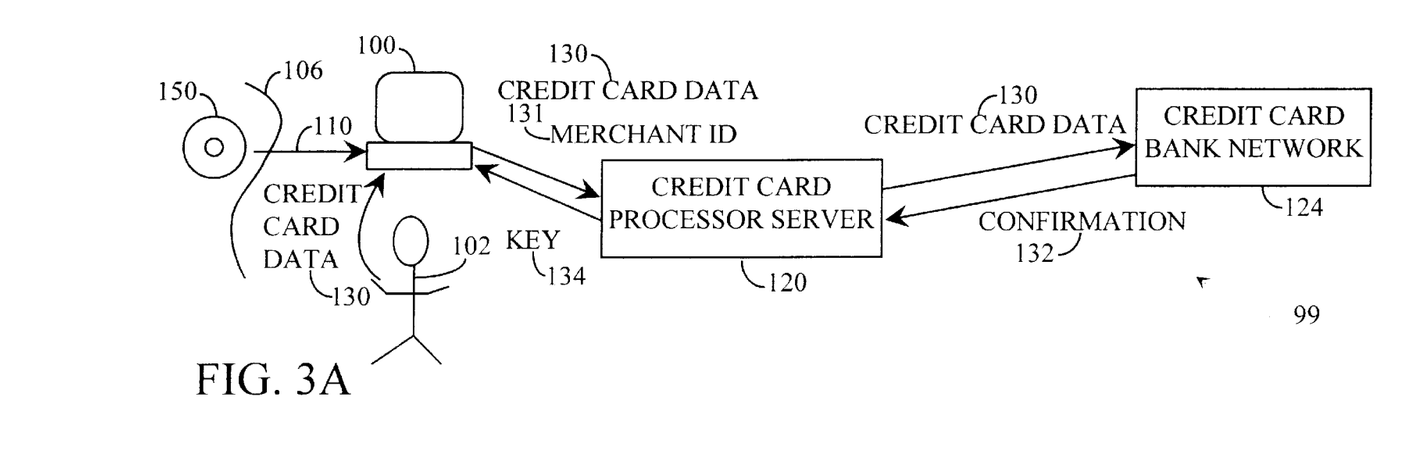
FIGS. 3A and 3B illustrate by data flow diagram methods under the present invention for digital product dissemination and sale by CD ROM and public network, respectively.

FIG. 3A further illustrates, by data flow diagram, the digital product dissemination and sale system 99 under the present invention. In FIG. 3A, a CD ROM 150 containing one or more packaged digital products 110 is taken from public domain 106 and inserted in PC 100. The user-consumer 102 executes a digital product 110 to first review information concerning the digital product available for purchase. Once the user 102 commits to purchase, credit card data 130 is entered at the keyboard of computer 100. Computer 100 then initiates the real time automated link 119 to the credit card processor server 120 and delivers credit card data 130 and merchant/product identification 131 thereto. Server 120, being permanently connected by real time automated link 122 with credit card bank network 124 forwards credit card data 130 and completes the debit/credit accounting within network 124, i.e., debits user 102 and credits a merchant 104. Bank network 124 then returns a confirmation 132 to server 120 and server 120 delivers an unlock key 134 to computer 100. Computer 100 then automatically uses key 134 to unpackage the digital product.

The entire transaction, beginning with the user-consumer 102 committing to purchase of a selected digital product, occurs in less than one minute by virtue of real-time automated links 119 and 122 and the direct and dedicated connections established thereby. The only information that user-consumer 102 need manipulate manually, i.e., enter at the computer 100 keyboard, is his or her credit card data 130.

Figure 3B:
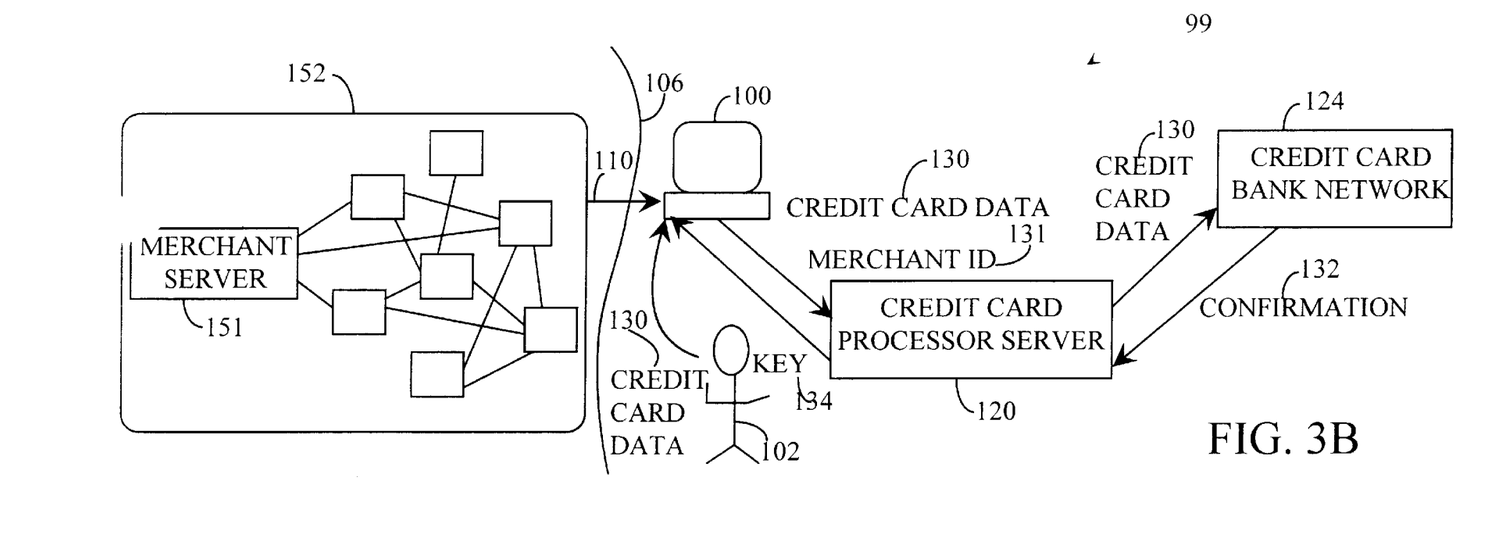

FIG. 3B also illustrates by data flow diagram the digital product dissemination system 99 under the present invention as applied to dissemination on the Internet. In FIG. 3B, a merchant server 151 exists on Internet 152, i.e., one of merchants 104 maintains merchant server 151 to make available packaged digital products 110. User-consumer 102, executing communication and file transfer programming on personal computer 100, downloads from Internet 152 one or more packaged digital products 110. User-consumer 102 then executes a selected digital product 110 on personal computer 100. Important to note, obtaining a digital product 110 occurs in public domain 106. As described in FIG. 3A, execution of digital product 110 on computer 100 causes computer 100 to establish a private phone link 119, complete the debit/credit transaction, and eventually receive and automatically apply the unlock key 134 to deliver the selected digital product.

Thus, the user-consumer 102 obtains packaged digital products 110 in public domain 106, but obtains access to the actual digital product in a private, direct, and automated telephone interaction between computer 100 and credit card processor server 120. In this manner, credit card information need not be provided directly or indirectly to a merchant 104 or be entered into and travel over a public network. Instead, the publishing merchant 104 is merely credited the purchase price in the credit card bank network. The user-consumer 102 enjoys enhanced privacy and convenience because credit card information goes directly and only to the credit card bank network, and is never placed on the Internet.

Figure 4:
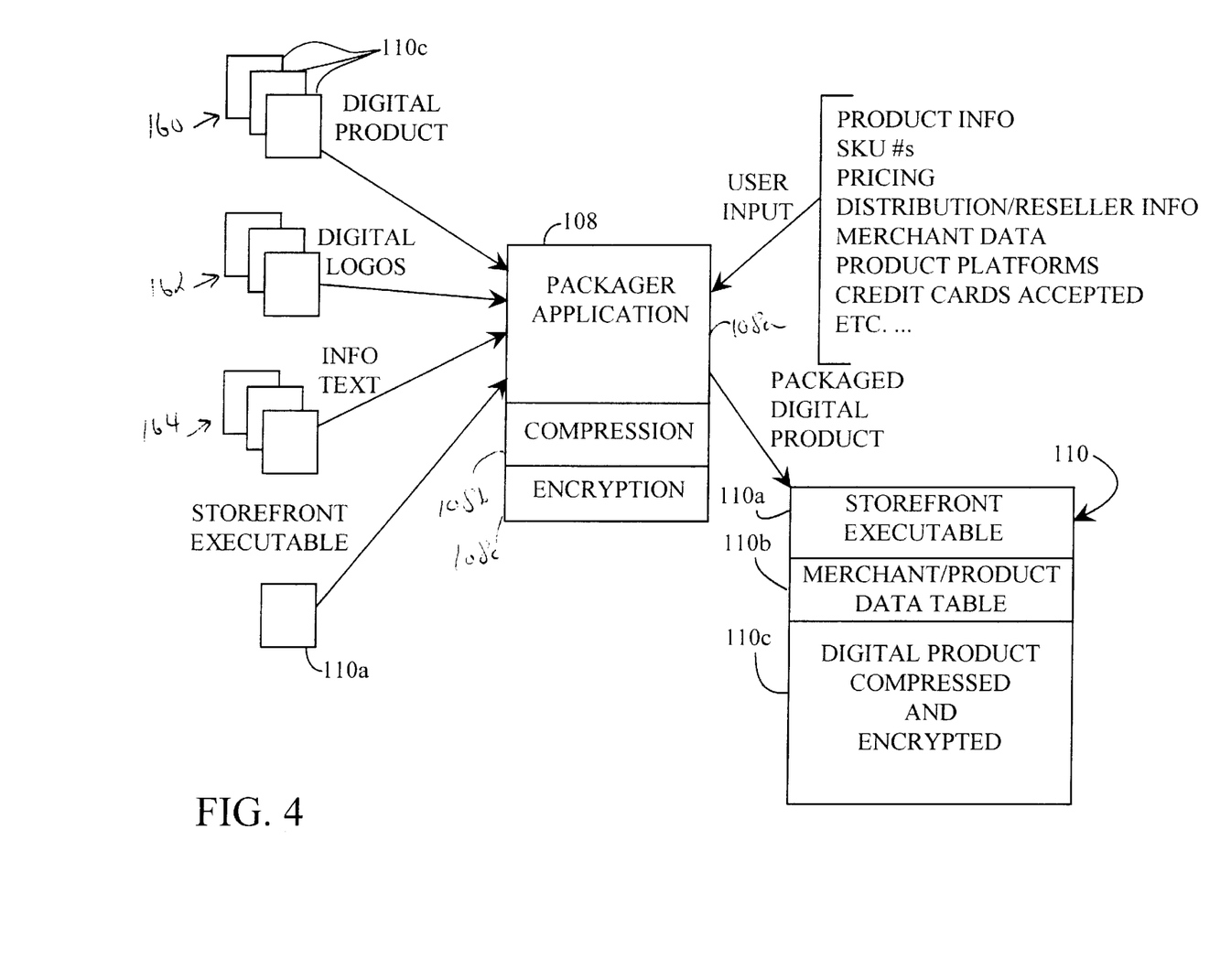
FIG. 4 illustrates manufacture of a packaged digital product according to a preferred form of the present invention.

FIG. 4 illustrates the structure and manufacture of a packaged digital product 110. In FIG. 4, a "storefront" program 110a is directly executable on personal computer 100. Program 110a, detailed by flow chart in FIGS. 5 and 6, allows user-consumer 102 opportunity to review information and demonstration programs relative to the actual digital product available for purchase. A merchant/product data table 110b contains information specific to the digital product available for purchase and the corresponding merchant. As described more fully hereafter, table 110b allows program 110a to verify the content of the digital product available for purchase. Finally, digital product 110c contains an encrypted and compressed form of the actual digital product, i.e., a version unusable without a unlock key.

A packager 108 application builds a packaged digital product 110 from a variety of source material and uses compression function 108b and encryption function 108c to produce the final compressed and encrypted digital product 110c. Digital product 110c originates as a collection of files 160 executable and/or usable on personal computer 100. Merchant 104 also provides files 162 comprising digital logos, product information, and other forms of marketing materials for use in presentation to user-consumer 102 during execution of the storefront executable file 110a. Text files 164 provide additional information to user-consumer 102 during execution of the storefront executable 110a. Finally, the storefront executable 110a is taken by packager 108 for incorporation into the packaged digital product 110. During execution of packager 108 application 108a, an operator, merchant or vendor manually enters additional information concerning the particular digital product 110c available for purchase, e.g., general product information, SKUs, pricing, distribution/reseller identifiers and information, merchant data, product platforms, types of credit cards accepted, and a variety of other information characterizing the particular digital product 110c available for purchase.

Thus, packager 108 application 108a takes files 160, 162, 164, and 110a, and takes the operator input to produce as its output the final packaged digital product 110. This packager 108 output, i.e., the packaged digital product 110, is then mass produced by copying onto a variety of distribution platforms, e.g., CD ROMs, distribution diskettes, posting on bulletin boards, and posting on Internet sites. Once the packaged digital products 110 are publicly distributed, user-consumers 102 obtain copies of digital products 110 and execute the packaged digital products 110 on their personal computers 100 for use thereon.

Important to note, the final packaged digital product 110 may be distributed across a wide variety of platforms, e.g., distribution diskettes, CD ROM, bulletin board posting, and Internet availability.

Figure 5:
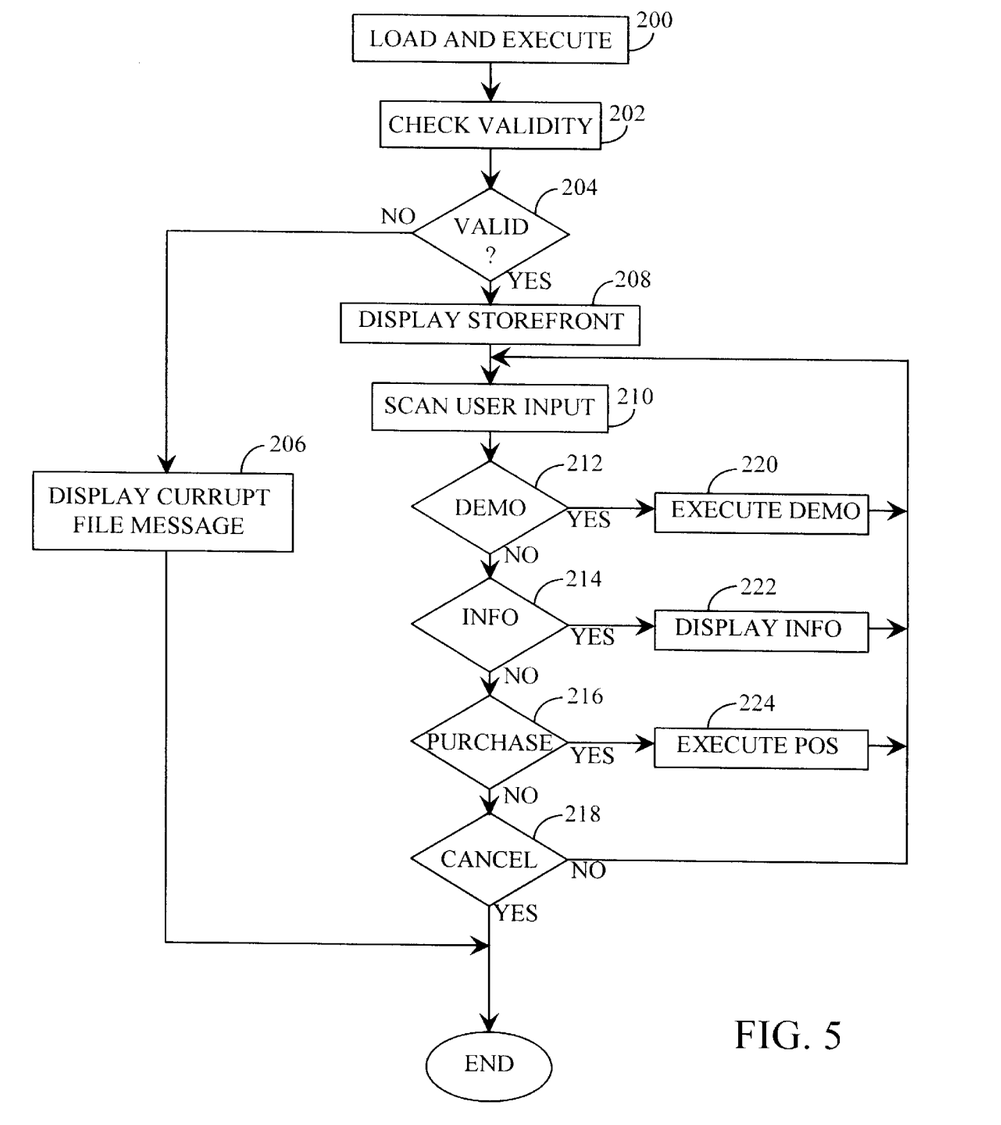
FIG. 5 illustrates by flow chart execution of the packaged digital product illustrated in FIG. 4 on a user-consumer's personal computer.

FIG. 5 illustrates by flow chart execution of a packaged digital product 110 on personal computer 100. Beginning at block 200 in FIG. 5, portion 110a of product 110 is loaded and execution begins. In block 202, portion 110b of product 110 is read and compared to portion 110c. The merchant/product data table 110b must accurately describe the content of portion 110c. For example, the number of files, file sizes, check sum values, and a variety of other aspects of portion 110c must correspond to the description provided in table 110b. This prevents delivery of a corrupted form of the digital product. In decision block 204, if the validity check shows corruption or viral infection, then processing branches through block 206, where the user consumer 102 receives a "corrupt file" message indicating inability to unpackage the product, and processing terminates. Otherwise, a positive validity check advances processing from decision block 204 to decision block 208.

In block 208, computer 100 presents user-consumer 102 with a storefront screen display. For example, the publishing merchant 104 logo and associated information concerning the digital product available for purchase may be displayed. Further, the user is given options at this point regarding the review and purchasing steps associated with the digital product available for purchase. The storefront display includes user input opportunities, e.g., mouse-activated buttons, to drive the program. In block 210, computer 100 scans for user input, e.g., scans for activation of one of the mouse-activated buttons. Decision blocks 212, 214, 216, and 218 represent user selected options regarding presentation of demonstration programs, presentation of information screens, execution of purchase or point of sale programming, and a cancel option, respectively.

If the user selects the demonstration option, then processing branches through block 220 where computer 100 executes a demonstration program relative to the digital product available for purchase and processing returns to block 210. If the user selects an information option, then processing branches at block 214 through block 222 where computer 100 displays information screens concerning the product available for purchase and processing returns to block 210. If the user selects the purchase option, then processing branches at block 216 through block 224 where computer 100 executes a point of sale (POS) program and processing returns to block 210. The POS program of block 224 is more fully detailed in FIG. 6 and discussed more fully hereafter. Finally, if the user selects the cancel option, then processing terminates following block 218.

Figure 6:
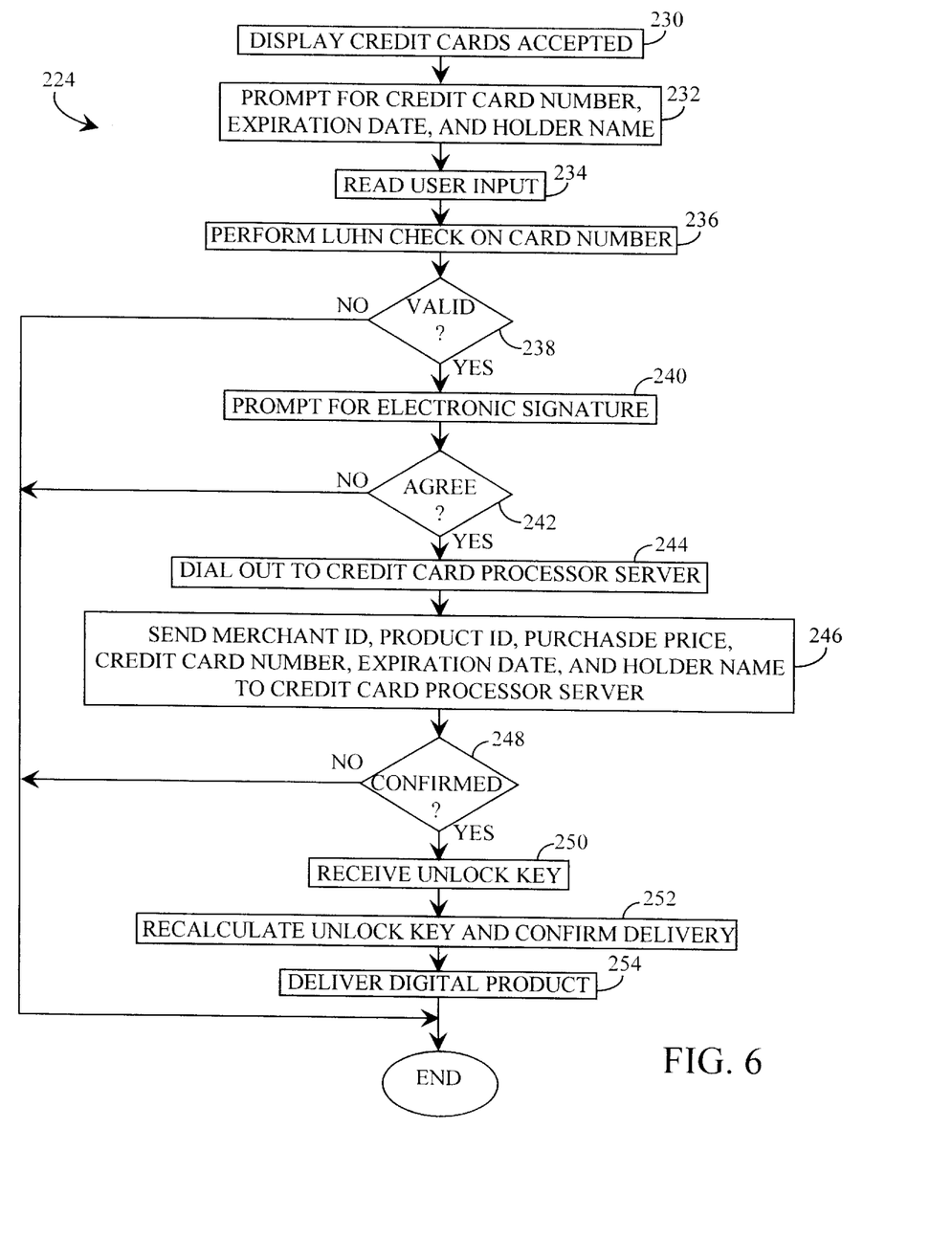
FIG. 6 illustrates by flow chart point of sale programming executing on a user-consumer's personal computer allowing the user-consumer to purchase and obtain a usable form of a digital product selected for purchase.

FIG. 6 illustrates in more detail the point of sale (POS) programming represented in block 224 of FIG. 5. In FIG. 6, processing begins in block 230 where computer 100 displays the credit cards accepted. In block 232, computer 100 prompts user-consumer 102 for a credit card number, expiration date, and holder name. Continuing to block 234, computer 100 reads the user input, i.e., reads the credit card information provided by user-consumer 102.

In block 236, computer 100 performs an LUHN check on the credit card number provided. A valid credit card number will conform to this preliminary test, i.e., have an appropriate MOD 10 result when applied to the LUHN check. If the credit card number fails the LUHN check, then processing terminates at decision block 238. Otherwise, processing advances to block 240 where computer 100 obtains an "electronic signature" from user-consumer 102. At this point, computer 100 prompts for purchase confirmation including the purchase price and a final opportunity to decline purchase. If the user does not agree to the purchase, then processing terminates following decision block 242, otherwise processing advances to block 244.

In block 244, computer 100 dials out to the credit card processor server 120 in the direct, private, one-to-one telephone connection 119 (FIG. 2). Once the connection is established, computer 100 in block 246 sends the merchant ID, product ID, purchase price, credit card number, expiration date, holder name, and any other required transaction data to the credit card processor server 120 (FIG. 2). The credit card processor server 120 interacts directly with the credit card bank network 124. If the transaction is not confirmed by credit card processor server 120, then processing branches at decision block 248 and terminates. Otherwise, processing advances to block 250 where computer 100 receives from the credit card processor server the unlock key needed to "unpackage" the digital product stored in portion 110c of digital product 110. In block 252, computer 100 recalculates the unlock key to verify accuracy and also confirms to credit card processor server 120 delivery of the unlock key. Processing then advances to block 254 where computer 100 delivers the digital product, i.e., decompresses and decrypts portion 110c of packaged digital product 110. A usable version of the digital product purchased is thereby copied onto personal computer 100.

At this point, user-consumer 102 has successfully received a working version of the digital product purchased. The merchant need not be involved in the purchase step, but has knowledge of the purchase by virtue of being credited the purchase price in the credit card bank network 124.

Figure 7:
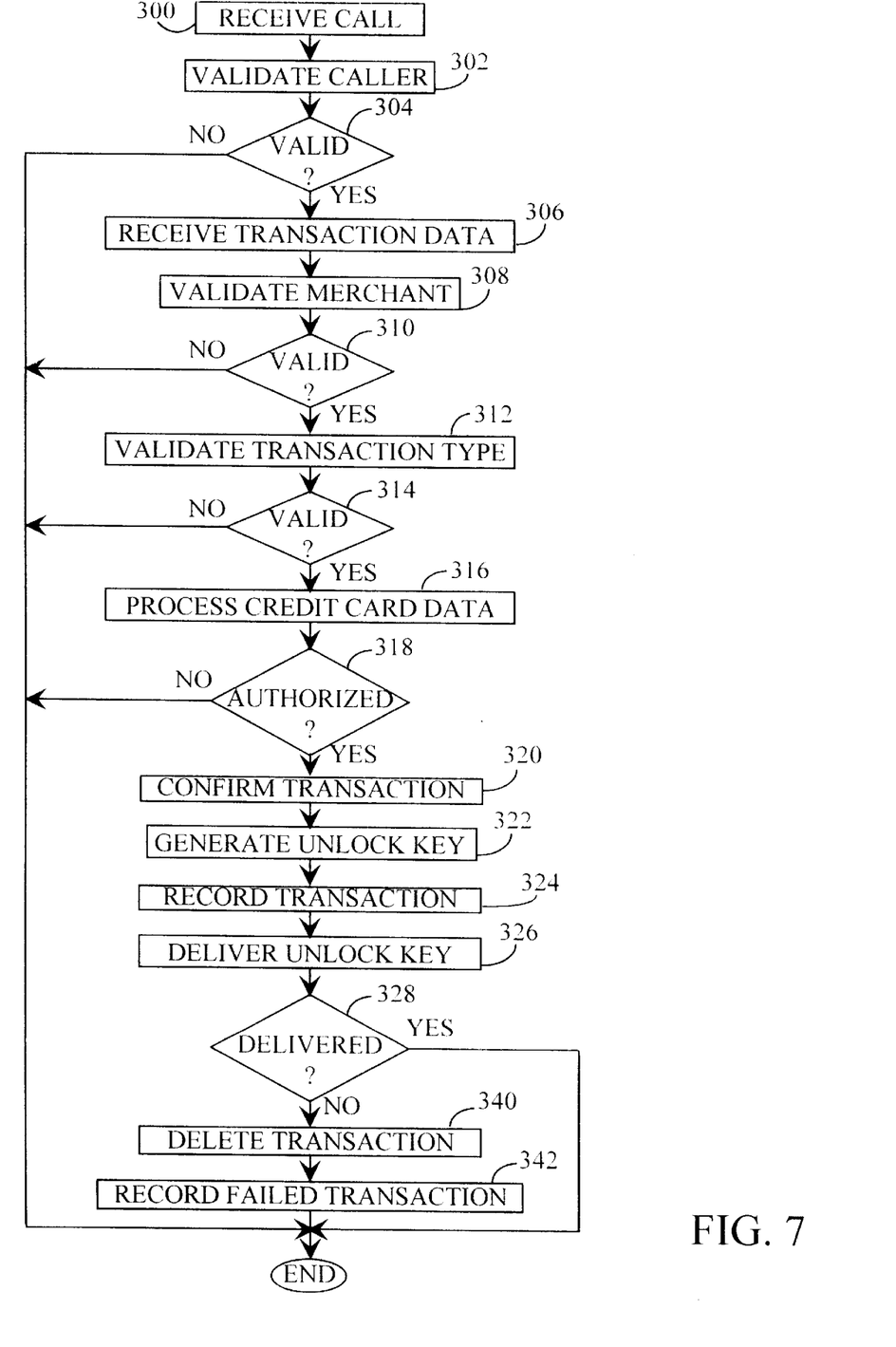
FIG. 7 illustrates by flow chart credit card processor server programming interactive with the point of sale programming illustrated in FIG. 6.

FIG. 7 illustrates programming activity at the credit card processor server 120. In FIG. 7, processing begins in block 300 where credit card processor server 120 receives a call from a personal computer 100 executing a packaged digital product 110. This step corresponds to block 244 of FIG. 6. Server 120 then validates the call in block 302 invalid, i.e., not originating from a packaged digital products 110, then processing branches at decision block 304 and terminates. Otherwise, in block 306 server 120 receives transaction data. More particularly, server 120 receives the data sent in block 246 of FIG. 6. Server 120 then accesses a merchant data base (not shown) and compares the received merchant ID with a list of merchants 104 registered for activity on system 99. If the merchant indicated is not a valid merchant, then processing branches at decision block 310 and terminates. Otherwise, processing advances to block 312 where processor server 120 validates the transaction type. An invalid transaction type causes termination at decision block 314, otherwise credit card processor server 120 processes the credit card data in block 316. More particularly, credit card processor server interacts with bank network 124 to accomplish a credit/debit transaction in network 124 debiting user-consumer 102 and crediting the identified publishing merchant 104. If, for some reason, the credit card transaction is not authorized, then processing branches at decision block 318 and terminates. Otherwise, server 120 confirms to personal computer 100 the credit card transaction in block 320. This step corresponds to block 248 in FIG. 6.

Continuing to block 322, credit card processor server generates the unlock key required to make available the digital product selected for purchase. In block 324 and 326, server 120 records the credit card transaction and delivers the unlock key to personal computer 100, respectively. If computer 100 confirms delivery of the unlock key, as indicated in block 328 of FIG. 6, then processing terminates. Otherwise, credit card processor server executes blocks 340 and 342 where the credit card transaction is deleted and a failed transaction is recorded, respectively.

Thus, computer 100 and credit card processor server 120 interact automatically and directly to accomplish a credit/debit transaction without providing sensitive credit card data to any entity other than the credit card bank network 124. The publishing merchant 104 need not be involved in the purchase and delivery steps. User-consumer 102 need only enter his or her credit card information, and wait briefly, e.g., approximately one minute, while the automated transaction between computer 100 and server 120 occurs. Following this brief interaction, a useable form of the digital product is made available to user-consumer 102. The time required to decrypt and decompress the purchased digital product depends on the size and compression technology used, but only several minutes are typically needed to deliver the digital product to user-consumer 102. Accordingly, once user-consumer 102 decides to purchase a digital product and initiates the purchase step, the digital product is available for use within a very short time span. Further, user-consumer 102 need not interact with any other person, e.g., an operator, nor manipulate complex encryption keys to make use of the purchased digital product. The user-consumer 102 gets virtually instantaneous gratification following a decision to purchase a digital product.

System 99 makes available a variety of digital product for purchase to a broad spectrum of potential purchasers, allowing distribution through a variety of media, e.g. Internet, CD ROM, disk copying, and bulletin boards. The system supports automated use of credit card payment and use of unique unlock keys, while protecting both the digital product itself and the credit card data against unauthorized interception and misuse.

It will be appreciated that the present invention is not restricted to the particular embodiment that has been described and illustrated, and that variations may be made therein without departing from the scope of the invention as found in the appended claims and equivalents thereof. For example, where credit card transactions have been shown similar credit/debit transactions, electronic checking, "e-cash", or purchase order processing may be conducted.

What is claimed is:

1. A system for distributing and selling a digital product to a plurality of consumers, each consumer having an associated consumer machine, said product comprising digital content useable on said consumer machines, said system comprising:

a product conversion process reversibly converting said digital product to a public state, said digital product in said public state being unusable on said consumer machines;

a product packaging process coupling as a packaged product said digital product in its public state and a point of sale program executable on said consumer machines, said point of sale program having ability to read said digital product in its public state and deliver an operable form of said digital product to said consumer machine for use thereon;

a public and unrestricted distribution process making said packaged product publicly available to a plurality of potential consumers by at least one of transfer of and copy among digital storage media; and a consumer executed purchase and delivery process wherein a given member of said potential consumers executes said point of sale program on a given consumer machine and selects said digital product for purchase, and wherein said point of sale program obtains from said given member financial information, relays said financial information to a banking entity, obtains authorization to purchase said product, and thereafter delivers said product by copying a useable form of said digital product onto storage media of said given consumer machine for use thereon.

2. A system according to claim 1 wherein said product conversion process includes encryption of said digital product.

3. A system according to claim 2 wherein said purchase and delivery process includes decryption of said digital product in its public state.

4. A system according to claim 1 wherein said packaging process couples said digital product and said point of sale program as a single file appearing executable on said consumer machines.

5. A system according to claim 1 wherein said purchase and delivery process includes automated one-to-one telephonic interaction between said given consumer machine and a credit card banking network.

6. A system according to claim 1 wherein said public distribution process includes at least one of distribution on CD ROM, posting on a bulletin board system, posting on a public network, and distribution on digital storage media.

7. A product distribution and sale system comprising:

a banking network receiving financial information and implementing real-time credit/debit transactions between members of a set of consumers and members of a set of merchants; and a public distribution system making available on storage media publicly and without restriction a packaged digital product, said packaged digital product including a copy of a product for purchase in an inoperable state and a point of sale program interactive with said banking network to relay financial information from and obtain a purchase authorization for a given consumer receiving said packaged digital product and executing said point of sale program on a consumer machine, said point of sale program upon execution converting said product from said inoperable state to an operable state useable on said consumer machine upon receiving said authorization for said given consumer.

8. A system according to claim 7 further comprising a given consumer machine receiving and executing thereon said packaged digital product.

9. A system according to claim 8 wherein following execution of said packaged digital product said given consumer machine receives said digital product in its operable state.

10. A system according to claim 7 wherein said public distribution system includes at least one of distribution on CD ROM, posting on a bulletin board system, posting on a public network, and distribution on digital storage media.

11. Apparatus for unrestricted public distribution and sale of a digital product useable on consumer machines, said apparatus comprising:

digital storage media containing a packaged digital product, said packaged digital product containing a point of sale program executable on said consumer machines and containing a form of said digital product unusable on said consumer machines, said point of sale program being executable on a given consumer machine for automated interaction with a banking network and for conversion of said unusable form of said digital product to a useable form of said product useable on said given consumer machine.

12. An apparatus according to claim 11 further comprising a given consumer machine receiving and executing thereon said packaged digital product.

13. An apparatus according to claim 12 wherein following execution of said packaged digital product said given consumer machine receives said digital product in its operable state.

14. An apparatus according to claim 11 wherein execution of said point of sale program on a given consumer machine presents an associated given consumer opportunity to purchase said digital product.

15. An apparatus according to claim 14 wherein, following said given consumer selection for purchase, said point of sale program executes said automated interaction with said banking network in a one-to-one telephonic communication.

16. An apparatus according to claim 11 wherein said digital storage media comprises at least one of a CD ROM, storage media on a bulletin board system, storage media on a public network, and storage media distributed physically in a public domain.

* * * * *